United States Patent [19]

Kormanek et al.

[11] Patent Number: 5,210,982
[45] Date of Patent: May 18, 1993

[54] ANIMAL GLUE HARDENING COMPOSITION AND ARTICLE AND METHOD OF MANUFACTURING THEREOF

[76] Inventors: Ronald S. Kormanek, 11 Ashlor Dr., Middle Grove, N.Y. 12850; Ilie V. Mandru, 54 Saratoga Blvd., Gloversville, N.Y. 12078

[21] Appl. No.: 644,305

[22] Filed: Jan. 22, 1991

[51] Int. Cl.$^5$ ................................................ C09K 3/14
[52] U.S. Cl. ........................................ 51/298; 51/302; 106/162
[58] Field of Search ................................ 51/295–300

[56] References Cited

U.S. PATENT DOCUMENTS

| | | | |
|---|---|---|---|
| 1,668,439 | 5/1928 | Westcott | 51/299 |
| 1,748,778 | 2/1930 | Leather | 51/308 |
| 2,075,276 | 3/1937 | Ellis | 106/22 |
| 2,269,415 | 1/1942 | Netherly | 51/295 |
| 2,543,777 | 3/1951 | Heasley | 51/300 |
| 3,329,488 | 7/1967 | Cofran | 51/296 |
| 3,331,667 | 7/1967 | Schnabel | 51/298 |
| 3,806,956 | 4/1974 | Supkis et al. | 51/281 |
| 3,836,376 | 9/1974 | Hampton et al. | 106/213 |
| 3,874,856 | 4/1975 | Leeds | 51/296 |
| 4,304,588 | 12/1981 | Moore, Jr. | 71/28 |

FOREIGN PATENT DOCUMENTS

| | | | |
|---|---|---|---|
| 666125 | 7/1963 | Canada | 51/297 |
| 63-47070 | 8/1986 | Japan | 51/301 |

OTHER PUBLICATIONS

Arcadion Corp., "Liquid Triazone Fertilizers" Neth. Appl. 17 Mar. 1986, 32 pages.

Primary Examiner—William R. Dixon, Jr.
Assistant Examiner—Margaret V. Einsmann

[57] ABSTRACT

A composition for hardening animal or collagen based glue comprising a stabilized product of urea formaldehyde is provided and an article and method of manufacture thereof. Animal glue containing the hardening composition has reduced solubility in water, reduced swelling capacity, increased thermal and mechanical properties, and a reasonable pot-life, without disturbing the natural ability of the animal glue to biodegrade. The disclosed hardened animal glue may be used to adhere abrasive particles to flexible sheets of paper or cloth, commonly used in the manufacture of sandpaper or sandcloth, and eliminates the need for application of a sizing coat to said flexible sheets.

17 Claims, 7 Drawing Sheets

ANIMAL GLUE HARDENING COMPOSITION AND ARTICLE AND METHOD OF MANUFACTURING THEREOF

FIELD OF THE INVENTION

This invention relates to the field of adhesives and, more particularly, to animal glue or collagen based glues. Most particularly, this invention is useful in the abrasive paper or cloth manufacturing industry as a strengthener or hardener which improves animal glue adhesives when used for adhering abrasive particles to flexible sheets of paper or cloth to form what is commonly known as sandpaper or sandcloth.

DESCRIPTION OF THE PRIOR ART

For well over one hundred years, animal collagen or protein has been used in the manufacture of glue or gelatin. Because animal glues have desirable characteristics such as low cost, flexibility, and an ability to naturally biodegrade, they are often times preferred to synthetic glues or resins when used in the abrasive paper or cloth manufacturing industry. However, animal glue also has a higher solubility in water, lower thermal and mechanical properties, and a greater swelling capacity than certain synthetic resins. These characteristics make animal glues somewhat less desirable. Some animal glues and gels have been modified and/or "hardened" in an attempt to improve these shortcomings. Various compositions containing animal glues have been made to improve adhesives made from such glues.

Of the known compositions for animal glues or animal glue-hardeners, there still exists a need for an improved animal glue or an animal glue-hardener which improves the adhesive properties of the animal glue and which is environmentally safe and cost efficient. A need also exists for a hardening additive which maintains a reasonable working pot-life of the protein glue.

SUMMARY OF THE INVENTION

This need for improving animal glues is addressed in accordance with the principles of the present invention. A composition is disclosed comprising an animal glue-hardener which reduces the solubility of the glue in water, increases thermal and mechanical properties of the glue, and reduces the swelling capacity of the glue by acting as a cross-linker of certain hydrophilic groups on the animal glue protein macromolecule. However, the protein chain cross-linking is controlled by a stabilizer contained in the hardening composition, so as to allow the glue system to maintain a reasonable pot-life. A method and article of manufacture of such a hardener is also disclosed.

Under certain conditions, animal glues exhibit improved adhesive properties when the inventive hardener composition is added. The animal glue-hardener is comprised of (1) the product of the reaction between urea and formaldehyde which can form a hydroxymethyl compound of urea, such as dimethylol urea (DMU); and (2) a stabilizer comprised of a latex copolymer such as vinyl-acetate-dibutyl-maleate, or a polyhydroxylic stabilizer such as tannin or a polysaccharide, including dextrin, corn starch and sugar; or ammonia. Other acceptable stabilizers are disclosed. The stabilized hardener is added to animal glue to form a strengthened glue gel composition. A method of preparing the inventive glue gel composition is disclosed comprising 1) reacting urea with formaldehyde in a ratio of approximately 1:1.7 to 1:2.4 moles of urea to formaldehyde to form a solution of dimethylol urea;
2) adding a latex or polyhydroxylic stabilizer to said dimethylol urea to form a stabilized DMU hardener; and
3) adding the stabilized DMU hardener to an animal or collagen based glue.

In addition, an abrasive material comprising, in part, the inventive glue gel containing the inventive stabilized hardener is also disclosed.

DMU is a cross-linker which reacts well with the hydrophilic groups contained in the macromolecular chain of the animal glue protein. When added to DMU, a latex or polyhydroxylic stabilizer controls the reaction of the DMU with the protein chain of the glue to prevent an overreaction or overcross-linking of the chain. If overcross-linking were allowed to occur, it would cause the glue to achieve an unacceptably high viscosity within an unacceptably short time limit, also referred to as an unacceptably short pot-life.

Accordingly, it is a principle object of this invention to increase the cross-linking of animal glue protein macromolecules without unacceptably reducing the pot-life.

It is a further object of this invention to decrease the number of hydrophilic groups on animal protein macromolecules.

An advantage of this invention is the reduced solubility in water of the hardened animal glue.

A further advantage of this invention is the decreased swelling capacity of the hardened animal glue.

A still further advantage of this invention is the improved thermal and mechanical properties of the hardened animal glue.

A still further advantage of this invention is the preservation of a reasonable pot-life of the hardened animal glue.

A still further advantage of this invention is the reduced brittleness of hardened animal glue gel films.

A still further advantage of this invention is that the stabilized hardener is environmentally safe. The disclosed hardener does not appreciably inhibit the animal glue's ability to biodegrade.

A still further advantage of this invention is the stabilized hardener is cost effective.

A still further advantage of this invention is the elimination of the need for a sizing coat, which is customarily applied to an abrasive paper or cloth after an animal glue is applied.

A still further advantage of this invention is the use of the hardened animal glue on abrasive paper or cloth which requires no significant modification of existing manufacturing equipment customarily used in the abrasive paper or cloth manufacturing industry.

A still further advantage of this invention is the availability and low cost of the components of the hardener composition, thus rendering hardened animal glue cost competitive with synthetic resins, while at the same time, exhibiting certain superior qualities.

BRIEF DESCRIPTION OF THE DRAWINGS

These and other objects, aspects, features and advantages of the present invention will become more readily understood from the following detailed description when read in conjunction with the accompanying drawings in which.

DESCRIPTION OF THE PREFERRED EMBODIMENTS

Figure 1:
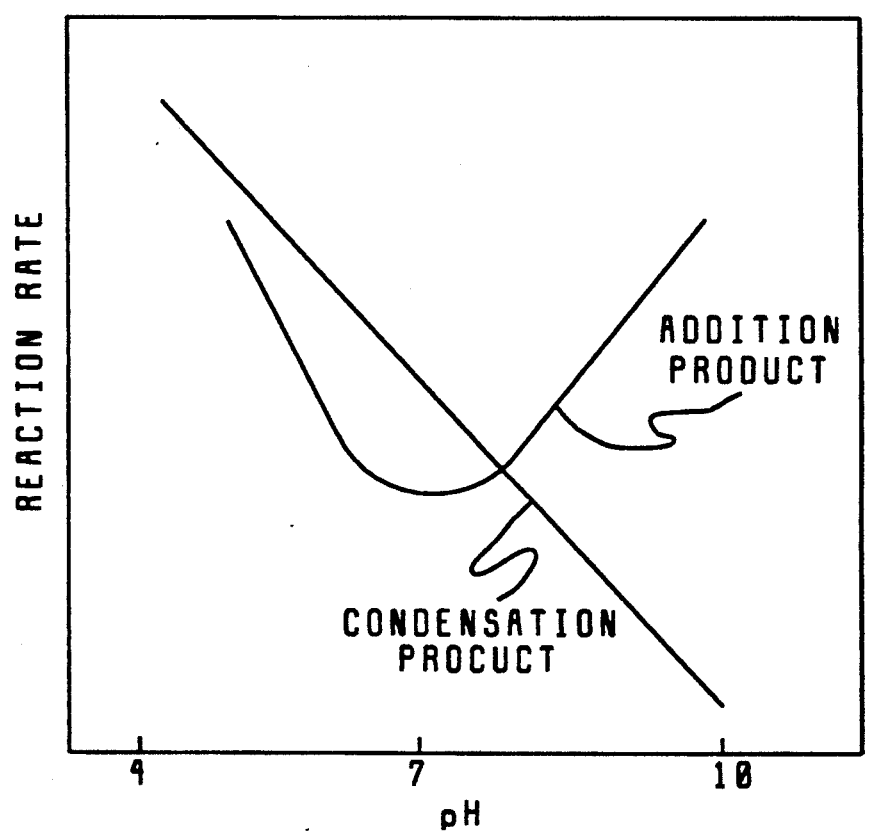
FIG. 1 shows the two types of reaction products of urea and formaldehyde and their relative rates of reaction as dependent on the pH of the reaction system.

The use of gelatins and/or animal glues in various industries is determined in part by their properties to form gels and films. Gelatin or animal glue has been recognized as a protein which can be particularly amenable to chemical modifications. The number and variety of reactive groups along the macromolecular chain open up the field for use of a very long list of potential reagents. From a practical point of view and for certain applications, the number of possible reagents is drastically reduced due to the instability of the reagent in water and cost considerations.

The glue protein macromolecule is readily soluble in water. This solubility has advantages and disadvantages. One such advantage lies in the subsequent speed and controllability of chemical reactions. A disadvantage is that reactions with gelatins precede most favorably in water. The choice of reactants must therefore be limited to those with a suitable stability in aqueous solutions.

Reactions along the macromolecular chain can either take the form of a substitution reaction at one or more of the glue chain's reactive sites, or a polyfunctional reaction wherein the reactant can bridge adjacent protein chains. This second type of reaction is termed cross-linking. A reactant which cross-links a gelatin is referred to as a hardener or strengthener.

The alpha and epsilon amino groups found on the protein macromolecule are believed to be the main reactive groups with the disclosed hardener. However, it has been shown that other groups along the protein chain can also react at higher temperatures and at higher concentrations of hardener than disclosed herein.

The cross-linking of gelatins and glues is most commonly carried out in aqueous solutions or in cast films. The concentrations of the glues and the cross-linker are very important factors in controlling the type of reaction and its speed.

Water uptake or swelling by gelatins and glues and their solubility in water are due to hydrophilic groups present in the chemical structure of the macromolecule. The improvement of the water resistance of the macromolecule is accomplished by diminishing the number of these hydrophilic groups and also by creating cross-linking bridges in order to increase the molecular weight of the macromolecule. This also improves the mechanical and thermal resistance of the glues.

The swelling capacity of a gelatin is an inverse measure of the degree of cross-linking of the gelatin. Therefore, the lower the swelling capacity the more cross-linking which has occurred. As the capacity of swelling and the solubility of the glue in water decrease, the mechanical and thermal properties increase due to the corresponding increase in molecular weight of the polymer chain because of the cross-linking.

As cross-linking of a protein increases the viscosity also increases. Generally, as the viscosity of the gelatin increases, the pot-life will decrease. If the cross-linking is allowed to continue unchecked, the solution can become visco-elastic. This is the critical problem with cross-linking. If the pot-life is excessively decreased, the glue becomes unworkable for industry standards.

The remarkable aspect of the disclosed glue-hardener is that when it is added to animal glue it causes a substantial increase in cross-linking. This translates into a decrease in swelling capacity, a decrease in solubility in water, an increase in mechanical and thermal properties, while simultaneously maintaining a reasonable working pot-life of the gelatin system.

When water is removed from a cross-linked system, the conditions for intermolecular cross-linking are improved still further yielding dried glues having a diminished capacity to swell in water. This is very desirable for the adhesives used in abrasive paper or cloth manufacturing.

DMU AS A CROSS-LINKER

The DMU hardening or strengthening additive used to cross-link the glue as described by this invention is obtained as an addition product of urea and formaldehyde, the addition product being referred to as dimethylol urea (DMU).

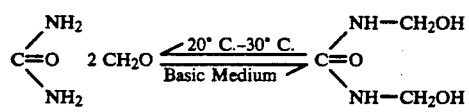

It is known that the reaction of the urea and formaldehyde is complex and is highly dependent upon the concentration and the ratio of urea to formaldehyde, the pH and the temperature. It has been established that the reaction can be catalyzed by both hydrogen ions and hydroxy ions. The rate of reaction is minimal at pH of around 7, and increases appreciably on both sides of the neutral region. In a basic medium at temperatures of 20° C.-30° C., the addition product of urea and formaldehyde will be dominant. In an acidic medium and at temperatures of 80° C.-100° C., the condensation product of urea and formaldehyde known as a urea formaldehyde resin will dominate the reaction. FIG. 1 shows this trend.

It is likely that the cross-linking of glue can precede by reacting the glue molecular protein directly with DMU using the following reaction.

Glue-$NH_3^+$ + HO—$CH_2$—NH—C—→Glue-NHCH$_2$—NH—C—+$H^+$+$H_2O$ (Glue+DMU→Cross-linked Glue)

DMU, known to be a hydroxymethyl compound of urea, can undergo intermolecular condensation to form oligomers. The two types of intermolecular condensation linkages are described below.

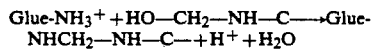

Methylene Bridges and

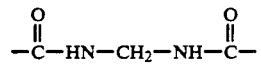

Dimethylene Ether Bridges

Since urea has a functionality to formaldehyde greater than two, the theory of polycondensation predicts the formation of networks or cross-linkages. Therefore, urea-formaldehyde resins (U-F resins) are able to form three-dimensional molecular insoluble networks. The formation of U-F resins is believed to assist the cross-linking of glue, by the release of formaldehyde during the U-F resin polymerization process.

In an acidic medium and at higher temperatures of between 80° C.-100° C., a network containing mainly methylene linkages is believed to form. The methylene bridges can be formed by two types of condensation reactions which liberate small amounts of water and formaldehyde:

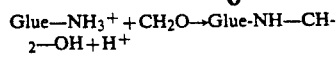

(Glue+Formaldehyde→Glue-Methylol-Derivate)

Glue-NH—$CH_2$—OH+$H_2N$-Glue→Glue-NH—$CH_2$—NH-Glue+$H_2O$ (Glue-Methylol-Derivate+Glue→Cross-linked Glue)

Based on these observations, hardeners comprising the addition and condensation products of urea and formaldehyde are disclosed.

PREPARATION OF DMU AS AN ADDITION PRODUCT

A preparation of DMU as a addition product of urea and formaldehyde takes place at temperatures between 20° C. and 30° C., and in a basic medium with a pH of between 8 and 11. The pH of the reaction medium is adjusted by adding sodium hydroxide (NaOH).

Solid urea and 37% solution of formaldehyde are mixed until the urea is dissolved. An initial drop in temperature to 10° C. will characteristically take place. The urea formaldehyde molar ratio can range from 1:1.7 to 1:2.4. The reactivity and stability of the final product depends strongly on the chosen ratio.

The final concentration of DMU can be adjusted by the addition of water to the reaction.

After mixing the urea and formaldehyde components together, and after the initial drop in temperature, the temperature of the system will begin to rise. Under continual stirring, the system must be cooled down in order to keep the temperature under 30° C. If the temperature rises above 30° C., a condensation reaction would take place leading to partial insolubility of the final product.

A typical example for preparing DMU as an addition product is as follows:

EXAMPLE 1

Mole ratio Urea:Formaldehyde 1.00:1.92;
480.00 g Urea (8.00 moles);
1120.00 ml $CH_2O$ 37% (1246.00 g solution, 461.00 g $CH_2O$ or 15.35 moles);
35.00 ml NaOH 2M;
200.00 ml $H_2O$;
pH initial=10.6-10.7;
18.00 ml $CH_3COOH$ 3M to bring pH to 6.8-7.0.
Temperature of reaction vessel=20° C.-30° C.

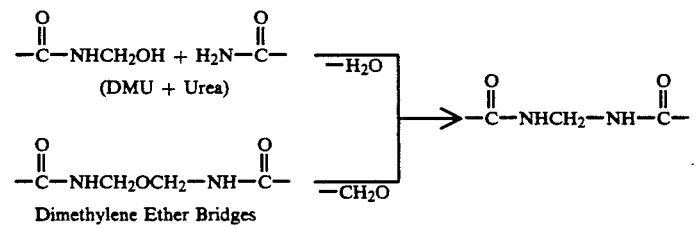

The reaction of the dimethylene ether bridges is of significant importance in using a DMU compound as a cross-linker. At higher temperature and in an acidic medium, formaldehyde is liberated and is believed to cross-link the glue protein molecules with the following reactions:

Depending on the pH and the initial reactant concentrations, the DMU starts to precipitate between 2 to 10 hours in the form of a white solid. The viscosity of the system increases steadily with constant stirring. Eventually, the viscosity reaches a gelatinous stage. The precipitation of the DMU addition product takes approximately 2 to 3 hours. Once the precipitation has occurred, the suspension of DMU is brought to a pH of 7 by adding $CH_3COOH$.

Through the above outlined method, DMU suspensions with a urea to formaldehyde ratio of 1:1.7 to 1:2.2 in concentrations between 43 and 48% were successfully prepared.

The suspension of DMU looks like a weak solid. If stirred, the viscosity drops appreciably depending on the duration and intensity. When left undisturbed, the weak solid characteristics are regained. This behavior is defined as thixotropic. The increase in viscosity during the undisturbed phase is due to the reaction continuing with the unreacted reactants as well as to the process of cross-linking between DMU molecules already formed, and to a ripening process which takes place in the polydispersed system.

A freshly prepared suspension of DMU as an additive product is readily soluble in water. If the suspension of DMU is allowed to stand for more time, it becomes a harder solid, comprised of an increasing amount of insoluble materials. With this hardening, the suspension becomes less suitable for use with glue. The hardening characteristics of various preparations of DMU are outlined in Table 1, wherein the stability over time of the DMU hardener is expressed in alphabetical grades.

The stability of the hardener is monitored by the solubility and dispersability in water and the stiffness of the mixture after one month.

Due to the tendency of the DMU to become partly insoluble and its difficulty in being dispersed in water, the DMU suspension must be stabilized against stiffness in order to render it soluble and easily dispersable.

PREPARATION OF A CONDENSATION PRODUCT—UF RESIN

A second type of hardening compound of urea and formaldehyde which reacts well with gelatin glue is disclosed. The reaction product of urea and formaldehyde via the condensation product pathways yields a urea formaldehyde (UF) Resin which reacts with the gelatin glue as illustrated by the above described pathway. To prepare this type of compound, a mixture of urea and formaldehyde in a ratio of 1:1.7 to 1:2.4 at a pH of 8-10 is heated at approximately 80° C.-100° C. for 30 to 45 minutes. The pH is then reduced to 5 with $CH_3COOH$ and heated for another 5 to 10 minutes. The mixture is then neutralized and cooled down rapidly.

A very viscous liquid is obtain which precipitates partially in time as a loose white solid. The precipitate is readily dispensable in the viscous liquid. This system is relatively stable for 2 to 3 months. Table 2 shows the UF-Resin's hardening characteristics for glue.

TABLE 1

HARDENING CHARACTERISTICS OF DMU PREPARED AT 25° C. WITHOUT ADDITIVES

| U/F RATIO | CONCENTRATION DMU(%) | pH of SYNTHESIS | g HARDENER/ 100 g glue | SWELLING Q 55 g water/ g glue | VISCOSITY @2 hr 37 C (cP) | STABILITY of HARDENER* over TIME |
|---|---|---|---|---|---|---|
| 1:1.92 | 48 | 11.0 | 6 | 2.07 | 440 | D |
| 1:1.92 | 48 | 11.0 | 6 | 2.09 | 340 | D |
| 1:1.92 | 47 | 9.3 | 4 | 2.08 | 270 | E |
|  |  |  | 6 | 1.84 | 300 |  |
|  |  |  | 8 | 1.75 | 370 |  |
| 1:1.92 | 43 | 8.2 | 4 | 2.06 | 350 | C |
|  |  |  | 6 | 1.85 | 400 |  |
|  |  |  | 8 | 1.60 | 520 |  |
| 1:1.92 | 55 | 8.8 | 7 | 1.85 | 350 | G |
| 1:1.85 | 58 | 9.0 | 6 | 1.85 | 330 | G |
| 1:1.74 | 52 | 9.0 | 8 | 2.10 | 340 | E |
|  |  |  | 10 | 1.90 | 400 |  |
| 1:2.24 | 52 | 8.4 | 8 | 1.80 | 1200 | G |
|  |  |  | 11 | 1.65 | 1700 |  |
| 1:2.20 | 44 | 5.5 | 10 | 2.00 | 1200 | E |

*STABILITY CHARACTERISTICS USED
B - System fluid and readily soluble with water
C - Weak paste readily soluble in water
D - Weak paste relatively water soluble
E - Hard solid with limited solubility
F - Very hard solid, difficult to disperse in water
G - Compact solid, practically indispersable

TABLE 2

HARDENING CHARACTERISTICS of UF-RESINS used for GLUE CROSSLINKING prepared @ 100 C without additives

| U/F RATIO | CONCENTRATION DMU(%) | INITIAL/ FINAL pH | g HARDENER/ 100 g glue | SWELLING Q 55 g water/ g glue | VISCOSITY @2 hr 37 C (cP) | STABILITY of HARDENER* over TIME |
|---|---|---|---|---|---|---|
| 1:2.2 | 54 | 9.0/5.3 | 6 | 1.70 | 380 | C |
| 1:1.92 | 54 | 9.0/5.4 | 13 | 1.70 | 400 | D |
| 1:1.92 | 43 | 8.6 | 6 | 1.94 | 380 | E |

TABLE 2-continued

HARDENING CHARACTERISTICS of UF-RESINS used for GLUE CROSSLINKING prepared @ 100 C without additives

| U/F RATIO | CONCENTRATION DMU(%) | INITIAL/ FINAL pH | g HARDENER/ 100 g glue | SWELLING Q 55 g water/ g glue | VISCOSITY @2 hr 37 C (cP) | STABILITY of HARDENER* over TIME |
|---|---|---|---|---|---|---|
| 1:1.64 | 58 | 9.0/5.9 | 12 | 2.15 | 400 | C |

*STABILITY CHARACTERISTICS USED
B - System fluid and readily soluble with water
C - Weak paste readily soluble in water
D - Weak paste relatively soluble in water
E - Hard solid with limited solubility
F - Very hard solid, difficult to disperse in water
G - Compact solid, practically indispersable Example 2 shows a typical preparation for obtaining a UF Resin.

However, a surprisingly higher and, thus, less desirable swelling capacity was observed.

TABLE 3

Hardening characteristics of DMU stabilized with U/F resins in a weight ratio of 2:1

| DMU obtained @ 25 C | | U/F RESIN obtained @ 100 C | | | HARDENING CHARACTERISTICS | | | STABILITY of HARD-ENER | DMU(%) in HARD-ENER |
|---|---|---|---|---|---|---|---|---|---|
| U/F RATIO | % DMU | U/F RATIO | CONC. % | ADDITIVE % | g HARDENER/ 100 g glue | SWELLING g water/ g glue | VISCOSITY (cP) | | |
| 1:1.92 | 54 | 1:1.92 | .43 | — | 6 | 1.86 | 380 | E | 50 |
| | | | | | 8 | 1.74 | 460 | | |
| 1:1.92 | 53 | 1:1.92 | 38 | — | 6 | 1.75 | 320 | D | 46 |
| | | | | | 8 | 1.70 | 340 | | |
| 1:1.92 | 55 | 1:2.05 | 42 | DEXTRIN* 8.3 | 7 | 1.98 | 380 | G | 51 |
| 1:1.92 | 55 | 1:2.00 | 44 | DEXTRIN 8.2 | 6 | 1.92 | 340 | E | 51 |
| 1:1.92 | 55 | 1:1.92 | 42 | DEXTRIN 8.3 | 6 | 1.88 | 380 | E | 50 |
| | | | | | 8 | 1.74 | 440 | | |
| 1:1.92 | 55 | 1:1.92 | 42 | DEXTRIN 8.3 | 6 | 1.95 | 360 | E | 50 |
| | | | | | 8 | 1.80 | 400 | | |
| 1:1.92** | 53 | 1:1.92 | 40 | — | 6 | 1.90 | 380 | D | 49 |
| | | | | | 8 | | | | |

*DEXTRIN added at the beginning of U/F - RESIN synthesis
**With DEXTRIN 5.5% on DMU synthesis
STABILITY CHARACTERISTICS USED:
B - System fluid and readily soluble with water
C - Weak paste readily soluble in water
D - Weak paste relatively water soluble
E - Hard solid with limited solubility
F - Very hard solid, difficult to disperse in water
G - Compact solid, practically indispersable

EXAMPLE 2

120.00 g Urea (2.00 moles);
283.00 ml $CH_2O$ 37% (315.00 g or 116.00 g $CH_2O$ or 3.86 moles);
120.00 ml $H_2O$;
5.00 ml NaOH 2M:pH initial=9.3;
Boil at 100° C. for 30 minutes;
Add $CH_3COOH$ 3M to bring pH to 5.3;
Boil for another 10 minutes;
Bring pH to 7 with NaOH;
Cooled down rapidly.

Generally, UF Condensation Resins have a lower reactivity with glue at the same concentration than the DMU addition product. However, the stability of the UF Resin and glue is greater over time. These characteristics led to the development of a hardener comprising the DMU addition product (DMU) and UF Resin condensation product in order to improve the stability of DMU over time.

The DMU-UF mixture is prepared using a ratio of 2:1 of DMU:UF-Resin by weight and mixing the mixture in a blender. Table 3 shows the DMU-UF resin mixture exhibits relatively greater stability than DMU alone.

DMU SUSPENSION OBTAINED IN THE PRESENCE OF A POLYHYDROXYLIC STABILIZER

In order to improve the stability of the DMU over time, various stabilizers were supplied to the DMU mixture during the reaction stage and/or after the DMU formation. Polyhydroxylic additives are so named because of the presence of more than one hydroxyl (OH) group. Several polyhydroxylic compounds were tested as stabilizers. In particular, polysaccarhides such as dextrin, sugar, corn starch. Also tested were tannin, and ammonia. Each stabilizer additive was added in a proportion of 6% to 12% based on the weight of the DMU. Dextrin proved to be the most efficient stabilizer of the above-mentioned additives.

Dextrin is sold under the tradename STADEX 128 and is manufactured by STALEY, of Decatur, Ill. Dextrin was added in concentrations of 5%-12% based on dry DMU. The cross-linking characteristics shown by the viscosity and swelling capacity decreased only slightly as compared to the straight DMU as shown in Tables 4 and 5 along with the hardening characteristics of glue treated with stabilized DMU and the stability of dextrin stabilized DMU.

TABLE 4

DMU HARDENER prepared at 25 C
presence of DEXTRIN as STABILIZER

| U/F RATIO | CONCENTRATION DMU(%) | DEXTRIN % of dry DMU | g HARDENER/ 100 g glue | SWELLING g water/ g glue | VISCOSITY 2 hr 37 C (cP) | STABILITY of HARDENER |
|---|---|---|---|---|---|---|
| 1:1.24 | 48 | 6 | 7 | 1.77 | 600 | E |
| 1:2.24 | 42 | 12 | 7 | 1.75 | 760 | C |
| 1:2.00 | 42 | 8 | 7 | 1.95 | 400 | C |
| 1:1.92 | 53 | 5.5 | 7 | 2.00 | 350 | F |
| 1:1.74 | 43 | 10 | 7 | 2.00 | 350 | B |
| 1:1.74 | 52 | 11 | 7 | 2.10 | 400 | E |

*STABILITY CHARACTERISTICS USED:
B - System fluid and readily soluble with water
C - Weak paste readily soluble in water
D - Weak paste relatively water soluble
E - Hard solid with limited solubility
F - Very hard solid, difficult to disperse in water
G - Compact solid, practically indispersable

TABLE 5

DMU HARDENER prepared at 25 C
STABILIZED with DEXTRIN added after 2-4 days

| U/F RATIO | CONCENTRATION DMU(%) | DEXTRIN % of dry DMU | g HARDENER/ 100 g glue | SWELLING g water/ g glue | VISCOSITY 2 hr 37 C (cP) | STABILITY of HARDENER |
|---|---|---|---|---|---|---|
| 1:1.92 | 41 | 7.5 | 8 | 2.07 | 440 | B |
|  |  |  | 10 | 1.91 | 600 |  |
| 1:1.92 | 43 | 5.0 | 8 | 1.93 | 440 | B→C |
|  |  |  | 10 | 1.93 | 570 |  |
| 1:1.92 | 45 | 2.5 | 8 | 1.98 | 440 | C |
| 1:1.92 | 43 | 5.0 | 8 | 1.94 | 470 | B→C |

*STABILITY CHARACTERISTICS USED:
B - System fluid and readily soluble with water
C - Weak paste readily soluble in water
D - Weak paste relatively water soluble
E - Hard solid with limited solubility
F - Very hard solid, difficult to disperse in water As seen from the above tables, the DMU stabilized with dextrin added at 2-5 days after the DMU synthesis shows a remarkable stability. Where ammonia was added at the end of the reaction time in the preparation of a UF Resin, the ammonia significantly extended the pot-life of the hardened glue, but increased the swelling capacity to an undesirable level.

The swelling capacity of the dried glue films is higher than the corresponding values for unstabilized DMU. The stabilizing capacity of that of sugar, corn starch and tannin are less effective than that of dextrin.

As mentioned above, a mixture of DMU and UF resin was prepared in an attempt to stabilize DMU over time.

Comparing Table 3 with Tables 4 and 5, it is observed that the DMU-UF resin mixture has a relatively better stability than DMU alone. However the swelling capacity is undesirably increased. Note, however, that Table 3 also shows that improved stability was found in cases when either the DMU or UF Resin was synthesized in the presence of dextrin.

After significant experimentation with the above-mentioned stabilizers, it was appreciated that the stabilizers of the suspension of DMU were not sufficiently efficient to fill the requirements of a large number of applications. Thus, a search began for a new and better way of stabilizing DMU. Various polymers and copolymers of latexes were discovered during this search.

LATEX STABILIZERS

Latexes of polymers and copolymers represent a very stable aqueous dispersion formed generally of particles in colloidal range of 1 to 100 nm. These polymers have a protective layer formed from a surfactant or other water soluble polymer anchored on the core of the polymer particle by adsorption or covalent bonding.

By adsorption of such stabilized polymer units on suspension particles of DMU, the possibility of attachment of DMU particles by further condensation reaction or as the result of ripening is reduced and, consequently, the stability in time is correspondingly enhanced. In addition to increased stabilization, it is believed that the presence of polymers and copolymers in the form of a high dispersed state such as a Latex, would be beneficial after drying the glue causing an increase in flexibility of the dried glue film. It is very likely that presence of polymers and copolymers in glue films help to bring about an increase in thermal and mechanical properties.

Several latex polymers and copolymers with the potential to improve both DMU stability and the final properties of dried glue films were tried. The following latexes were tested:

| Trade Name of Latex | Chemical Composition | Concentration % by Weight | Manufacturer |
|---|---|---|---|
| EVERFLEX GT | Copolymer of Vinyl-acetate-dibutyl maleate | 54–56 | W. R. GRACE |
| EVERFLEX RC | Acrylic | 55 | W. R. GRACE |
| CRILITEX N2 | Acrylic copolymer, self cross-linking | 40 | Sybron Chemicals |
| CRILITEX H50 | Acrylic Polymer | 46 | Sybron Chemicals |
| CRILITEX H58 | Acrylic Polymer | 43 | Sybron Chemicals |
| RESIN 701 | Vinylacetate polymer | 51 | Sybron Chemicals |
| AIR FLEX 400 | Vinyl-acetate-ethylene-copolymer | 55 | AIR-PRODUCTS and Chemicals Inc. |
| GEN-FLO 2001 | Styrene-Butadiene Copolymer | 43–51 | GENCORP, Polymer Products |
| GEN-FLO 3075 | Carboxy modified Styrene-Butadiene Copolymer | 43–51 | GENCORP, Polymer Products |

Each type of Latex was mixed thoroughly with a suspension of DMU in the concentration of 2.5%–12% dry Latex (solid) as based on the weight of the system. The stability of the Latex stabilized DMU was determined by the ease of the dispersability in water and the stiffness of the systems after one month.

The stability of the DMU suspensions depends strongly on the type of Latex and also on the concentration of the Latex used as a stabilizer (see Tables 6, 7, and 8).

TABLE 6

DMU HARDENER prepared at 25 C
stabilized with EVERFLEX GT(U/F ratio 1:1.92)

| CONCENTRATION DMU(%) | CONCENTRATION LATEX(%)* | g HARDENER/ 100 g glue | SWELLING g water/ g glue | VISCOSITY 2 hr 37 C (cP) | STABILITY of HARDENER |
|---|---|---|---|---|---|
| 36 | 12 | 6 | 1.80 | 340 | C |
| 39 | 5 | 6 | 1.85 | 400 | B |
|  |  | 8 | 1.80 | 560 |  |
| 43 | 5 | 6 | 2.00 | 350 | B |
|  |  | 8 | 1.86 | 400 |  |
| 44 | 5 | 6 | 1.80 | 360 | C |
|  |  | 8 | 1.65 | 440 |  |
| 45 | 5 | 6 | 1.80 | 300 | C |
|  |  | 8 | 1.70 | 400 |  |
| 44 | 5 | 8 | 1.90 | 410 | B→C |
|  |  | 10 | 1.90 | 580 |  |
| 44 | 5 | 8 | 1.90 | 470 | C |
| 46 | 2.5 | 6 | 1.86 | 400 | C |

*Based on system: DMU + Water + Latex
STABILITY CHARACTERISTICS USED:
B - System fluid and readily soluble with water
C - Weak paste readily soluble in water
D - Weak paste relatively water soluble
E - Hard solid with limited solubility
F - Very hard solid, difficult to disperse in water
G - Compact solid, practically indispersable

TABLE 7

DMU HARDENER prepared at 25 C
stabilized with LATEX RESIN 701(U/F ratio 1:1.92)

| CONCENTRATION DMU(%) | CONCENTRATION LATEX(%)* | g HARDENER/ 100 g glue | SWELLING g water/ g glue | VISCOSITY 2 hr 37 C (cP) | STABILITY of HARDENER |
|---|---|---|---|---|---|
| 38 | 10 | 6 | 1.93 | 340 | F |
| 40 | 9.0 | 6 | 2.08 | 420 | F |
| 42 | 5.7 | 6 | 1.95 | 340 | E |
| 44 | 5.0 | 6 | 1.95 | 400 | E |

TABLE 7-continued

DMU HARDENER prepared at 25 C
stabilized with LATEX RESIN 701(U/F ratio 1:1.92)

| CONCENTRATION DMU(%) | CONCENTRATION LATEX(%)* | g HARDENER/ 100 g glue | SWELLING g water/ g glue | VISCOSITY 2 hr 37 C (cP) | STABILITY of HARDENER |
|---|---|---|---|---|---|
| 46 | 2.5 | 6 | 1.86 | 320 | D |

*Based on system: DMU + Water + Latex
STABILITY CHARACTERISTICS USED:
B - System fluid and readily soluble with water
C - Weak paste readily soluble in water
D - Weak paste relatively water soluble
E - Hard solid with limited solubility
F - Very hard solid, difficult to disperse in water
G - Compact solid, practically indispersable

TABLE 8

DMU HARDENER prepared at 25 C
stabilized with LATEX AIRFLEX 400(U/F ratio 1:1.92)

| CONCENTRATION DMU(%) | CONCENTRATION LATEX(%)* | g HARDENER/ 100 g glue | SWELLING g water/ g glue | VISCOSITY 2 hr 37 C (cP) | STABILITY of HARDENER |
|---|---|---|---|---|---|
| 37 | 12 | 6 | 1.84 | 330 | D |
| 42 | 5 | 6 | 1.90 | 280 | F |
|    |   | 8 | 1.80 | 340 |   |
| 43 | 5 | 6 | 1.90 | 400 | D |
| 44 | 5 | 8 | 1.86 | 520 | D |
| 44 | 5 | 6 | 1.90 | 380 | C→D |

*Based on system: DMU + Water + Latex
STABILITY CHARACTERISTICS USED:
B - System fluid and readily soluble with water
C - Weak paste readily soluble in water
D - Weak paste relatively water soluble
E - Hard solid with limited solubility
F - Very hard solid, difficult to disperse in water
G - Compact solid, practically indispersable In order to assure good stability of the Latex stabilized DMU, the time between preparation of the DMU suspension and mixing the suspension with the Latex is critical. A period of four to five days appears optimal.

HARDENING GLUE WITH DMU CROSS-LINKER

The incorporation of the Latex stabilizer at the concentration necessary for stabilizing the DMU cross-linker does not induce any incompatibility with the glue solution during either the solution stage or the dry state of the glue.

A Brookfield Viscometer was used to monitor the change in viscosity, expressed in centipoise (oP), after mixing the glue solution with the latex stabilized DMU hardener as dispersed in water.

The effect of the latex stabilized DMU hardener on the glue solution and dried glue films is expressed by the increase in viscosity of the solution as a result of the increase in the glue molecular weight and cross-linking. A dramatic reduction of the solubility of the glue in water, especially at higher temperatures was also observed.

Before mixing the glue with the hardener solution, the pH of the glue solution is lowered by adding $CH_3COOH$ so that the final pH after mixing with the glue with the hardener approximated 5. Lowering the pH of the glue in this way has a beneficial affect on both the pot-life of the hardened glue and the swelling capacity.

The optimal concentration for the glue solution after mixing was in the range of approximately 25-30%. A hardener concentration of 1 to 20 grams for each 100 grams of glue was deemed acceptable. The mixture of the glue and latex stabilized hardener was obtained by mixing the solution of glue at a temperature of 55° C. to 60° C. with the hardener dispersed in water at 20° C. to 25° C. This mixture was cooled to and kept at 37° C. Viscosity was measured against time.

Example 3 shows a typical mixture of the glue and the glue-hardener.

EXAMPLE 3

300 g glue solution of 33% at 55° C., pH=4.8 realized by adding 7 ml $CH_3COOH$ 3M 100 g Latex stabilized DMU hardener solution dispersion at 20° C.–25° C. obtained by dispersing 1-20 g of hardener of 46-50% active solid in water The solutions are mixed together obtaining a system with a temperature of between 46°–47° C.

The system is cooled and kept at 36°–37° C.

In order to evaluate the cross-linking efficiency of the Latex stabilized DMU cross-linker, the mixture containing the glue and cross-linker was cast on aluminum trays and kept for 1 hour in an oven at 105° C. until a hardened glue film was obtained. The film's solubility in water and swelling capacity was evaluated.

A measure of the swelling capacity was obtained by immersing the dried glue film in water at a temperature of 55° C. and 18° C. for one half hour. The water absorption determined from the gain in the weight of the dried glue film is called the swelling capacity.

A measure of the solubility was determined during the swelling experiments as described above from the loss of weight of the glue films immersed in water for ½ hour. This loss of weight was determined by drying the swelled films at 105° C. in an oven for 2-3 hours. The cross-linked glue's solubility in water was drastically reduced.

Figure 2:
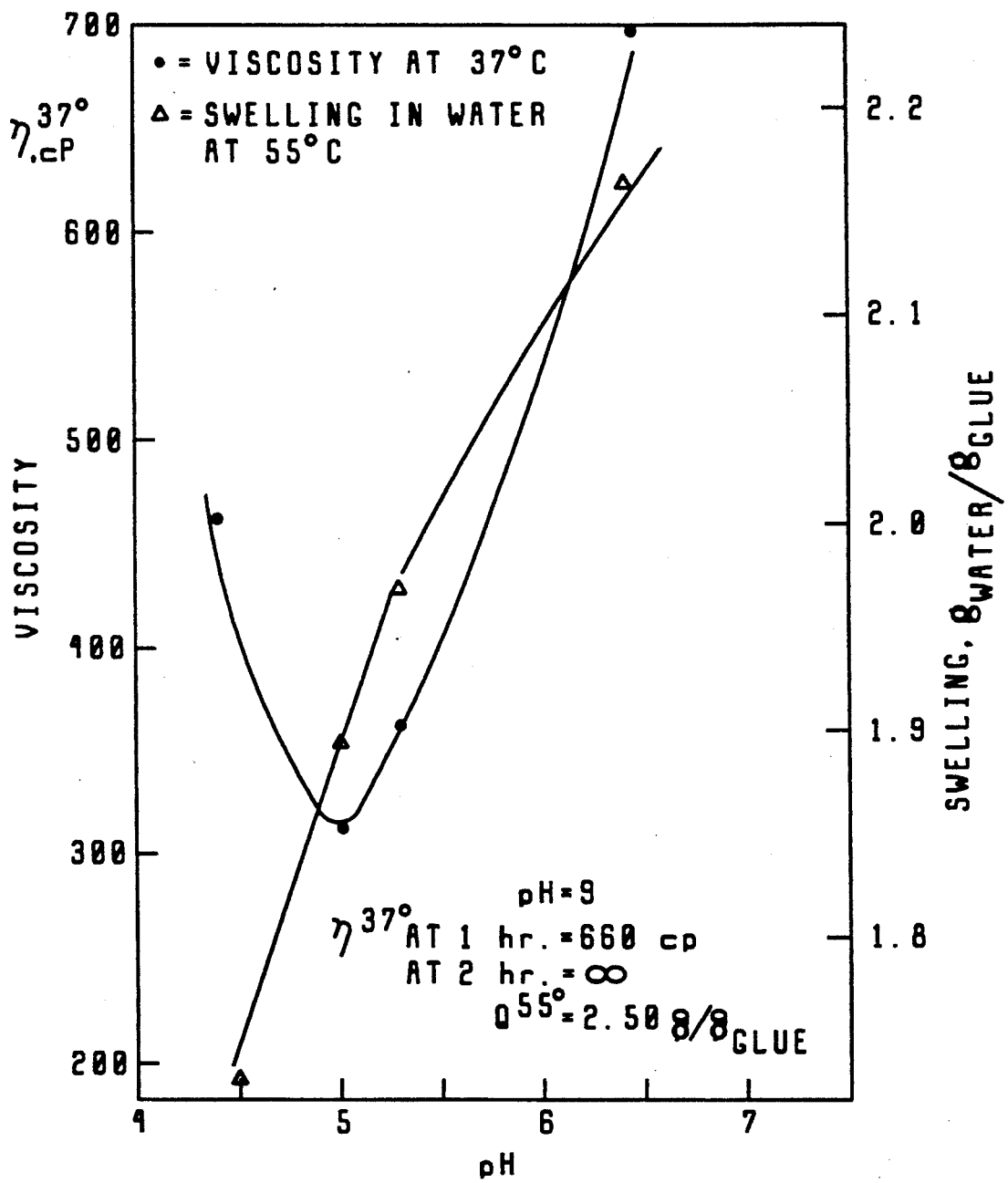
FIG. 2 shows the correlation between pH of the glue system and viscosity of the system at two hours, at a temperature of 37° C. for systems containing 25% glue, wherein the glue is comprised of 7 grams of hardener for each 100 grams of glue. In addition, FIG. 2 also shows the relationship of the swelling capacity at 55° C. to the pH of the system.

FIG. 2 shows the correlation of the viscosity of the glue-hardener and the swelling capacity at higher temperatures (i.e., 55° C.), with the pH of the reaction medium. FIG. 2 offers the possibility of choosing the desired parameters for the cross-linking process in order to achieve a certain goal with regard the properties of the final cross-linked product. Also, the viscosity measurements give the possibility of predetermining the pot-life of the glue hardened mixture.

The invention data offers not only a way to characterize the cross-linking efficiency but also the criteria in choosing the hardening parameters for certain applications.

In the case of this latex stabilized DMU glue-hardener, the pH of the mixture of the hardened glue has a considerable effect on the viscosity of the glue product and also the swelling capacity of dried film.

As illustrated in FIG. 2, the viscosity of the glue system is at a minimum at a pH of 5. There is a dramatic increase in the viscosity with increasing pH. At a pH of 9, the viscosity of the system is four times greater than the viscosity at the pH of 5. The swelling capacity however decreases continuously with the lowering of the pH.

The lowering of the pH under 5 is not recommended despite a favorable decrease in swelling capacity because the viscosity increase results in a shortened pot-life of the system.

The qualities of latex stabilized DMU as a cross-linker are dependent on a variety of factors including the ratio of urea to formaldehyde used in preparing the DMU suspension; the temperature of the synthesis; the concentration of the active solid DMU in the glue, the age of the sample, the method of preparation of the hardener solution.

Figure 3:
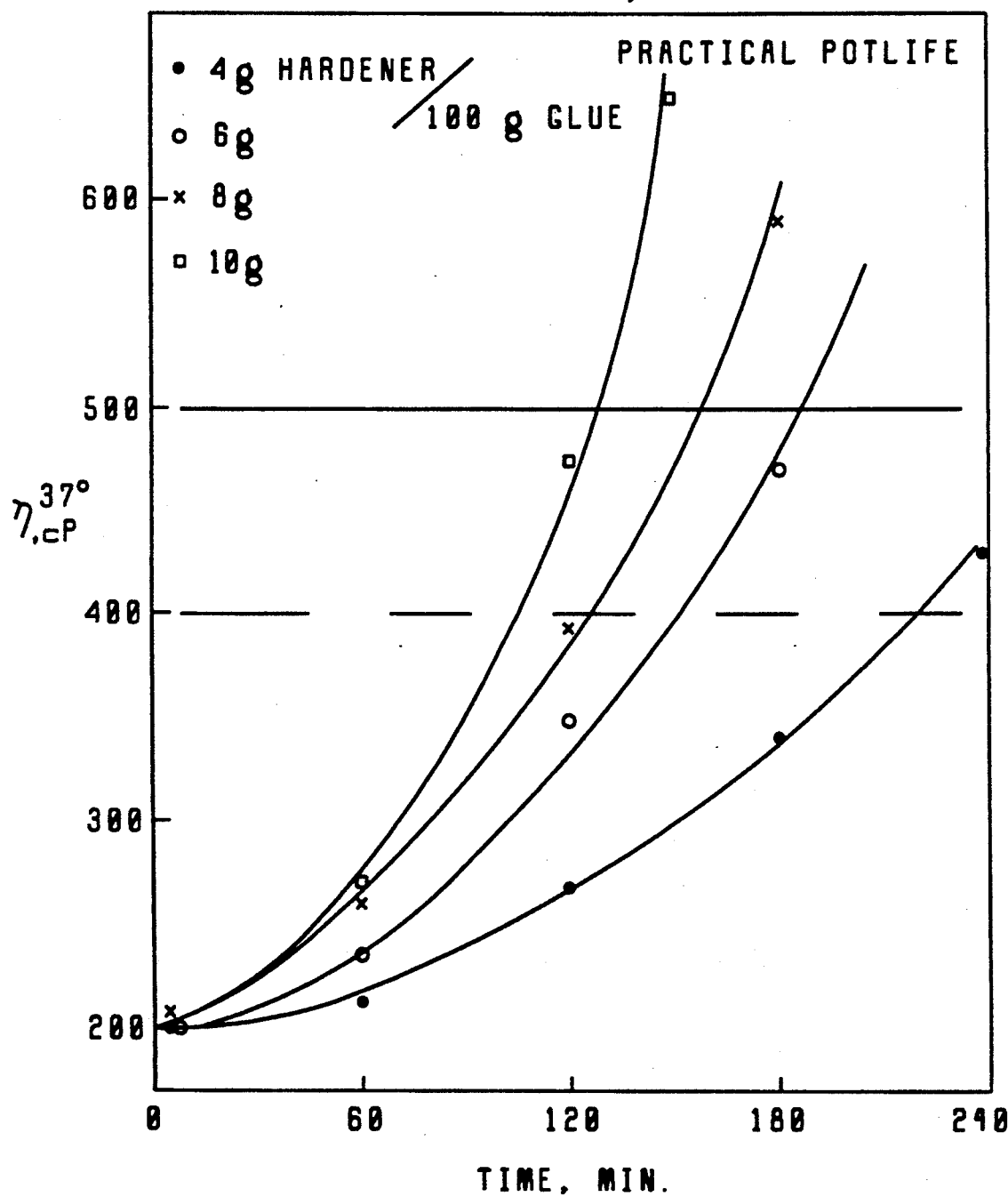
FIG. 3 shows the change in viscosity over time for solutions at 37° C. comprised of 25% glue containing DMU hardener, wherein the urea to formaldehyde molar ratio used to produce the DMU hardener is 1:1.92.
Figure 4:
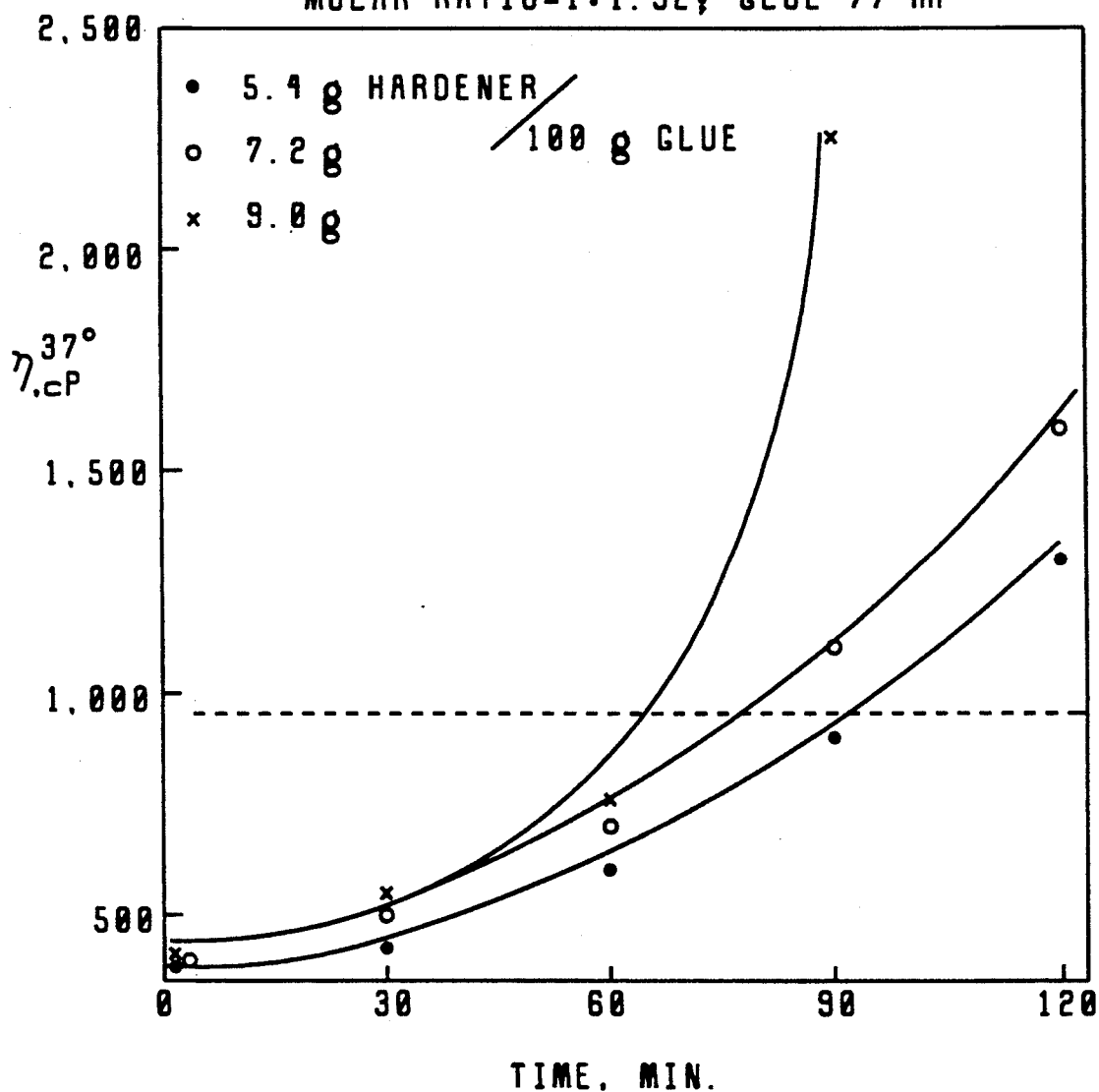
FIG. 4 shows the change in viscosity over time for solutions at 37° C. for systems containing 30% glue containing DMU hardener, wherein the urea:formaldehyde molar ratio used to produce the DMU hardener is 1:1.92.

An apparent characteristic of the glue-hardener system is illustrated by the system's change in viscosity, over time, as shown in FIG. 3 and 4. An increase in the molecular weight of the glue due to increased cross-linking, appreciably increases the viscosity. The rate of change in the viscosity is, therefore, directly related to the hardener and glue concentration and temperature.

A practical measure for the pot-life is shown by the time necessary to reach a certain value for viscosity suitable for a particular application.

For the systems of 25% glue at 37° C. as illustrated in FIG. 3, a practical viscosity of 500 centipoise would yield a pot-life of between 2 hours and 4 hours, depending on the hardener concentration.

FIGS. 3 and 4 show that an increase in the glue concentration results in an increase in the initial viscosity of the hardened glue system, compared to a glue system with a lower glue concentration. FIG. 4 shows the change on viscosity, over time, for solutions of 30% glue at 37° C.. The increase in glue concentrations substantially shortens the pot-life. In addition the rate of increase in viscosity, over time, is greater, resulting in a decrease in both the time to double the initial viscosity as well as the practical pot-life life of the glue system.

Figure 5:
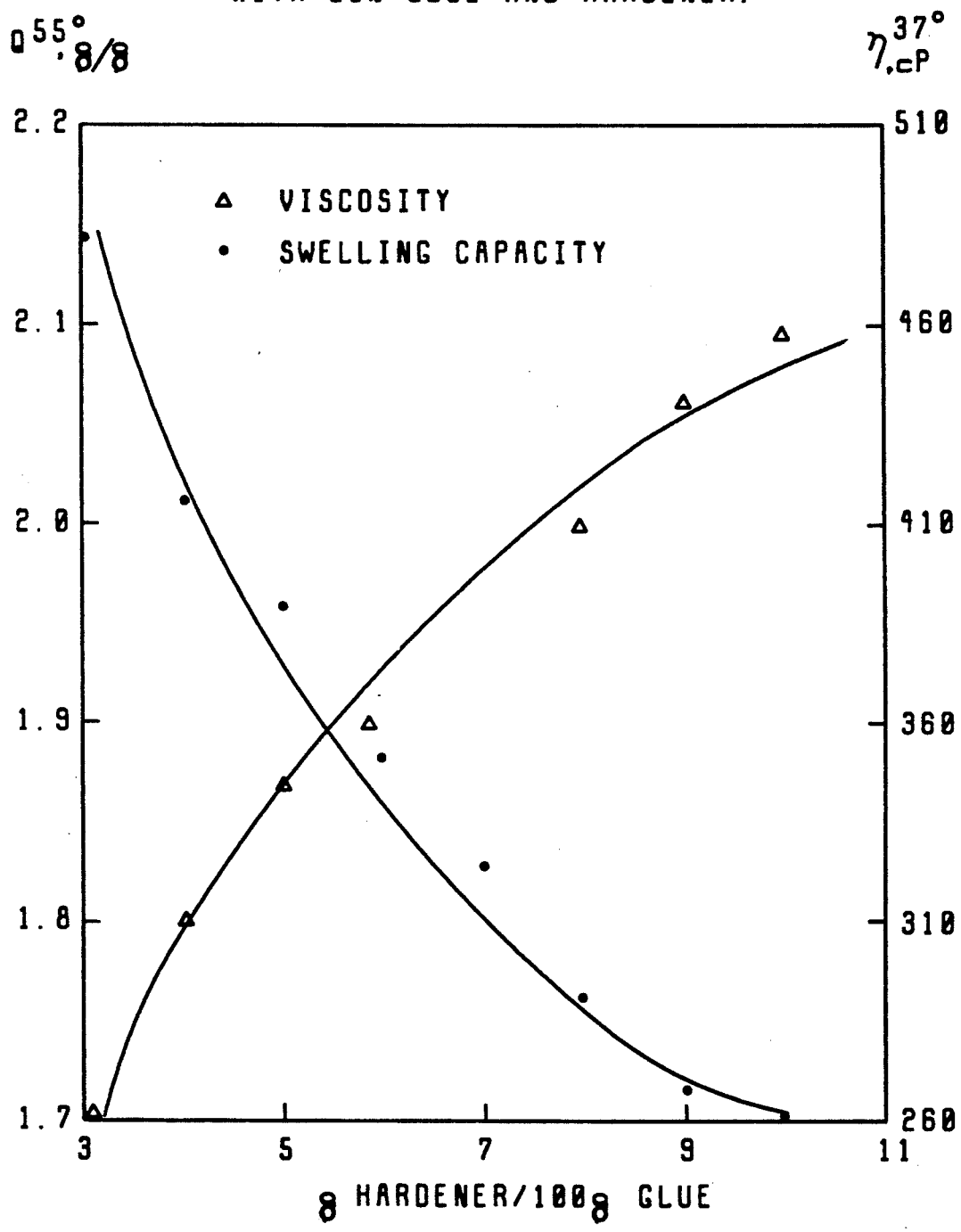
FIG. 5 shows the swelling capacity in water at 55° C. and the viscosity of the solution containing 25% hardened glue, wherein the grams of hardener per 100 grams of glue is varied from 3 grams of hardener to 11 grams of hardener.

FIG. 5 illustrates the effects of a change in the amount of hardener added to the glue system on viscosity and swelling capacity. The viscosity was measured at 2 hours at 37° C. The concentration of the glue solution is approximately 25%.

FIG. 5 shows that viscosity increases as the hardener concentration increases, and tends to level off at concentrations of greater than 8 grams of hardener per 100 grams of glue.

A direct measure of the cross-linking activity of the hardener is the capacity of the dried glue film to absorb water. The quantity of water absorbed is directly correlated to the number of hydrophilic groups present in the glue and also dependent on the degree of cross-linking achieved since cross-linking acts as a retardation factor on swelling, due to an apparent osmotic effect which tends to expel the solvent from the swelled polymer. The swelling capacity expressed as grams of water absorbed by 1 gram of glue is a direct measure of the cross-linking degree.

A non-cross-linked glue swells unlimitedly, i.e., it dissolves completely. This is especially true at higher temperatures. FIG. 5 shows a very slightly cross-linked glue will swell absorbing up to 5–6 grams of water per gram of glue. By increasing the cross-linking, the swelling capacity can be reduced drastically even at a temperature as high as 55° C.–60° C. reaching values of 1.7 grams of water per one gram of glue.

FIG. 5 also shows that the swelling capacity is directly dependent on the hardener concentration of the system with 25% glue. The decrease in the swelling capacity correlates with an increase in the hardener level and tends to level off at values higher than 8 grams per 100 grams of glue. This is most likely a result of the limited number of functional groups which can react with the hardener. Even though a continued increase in the hardener level brings about a further decrease in swelling, it is this increase in hardener level which is detrimental to the practical pot-life of the system.

Figure 6:
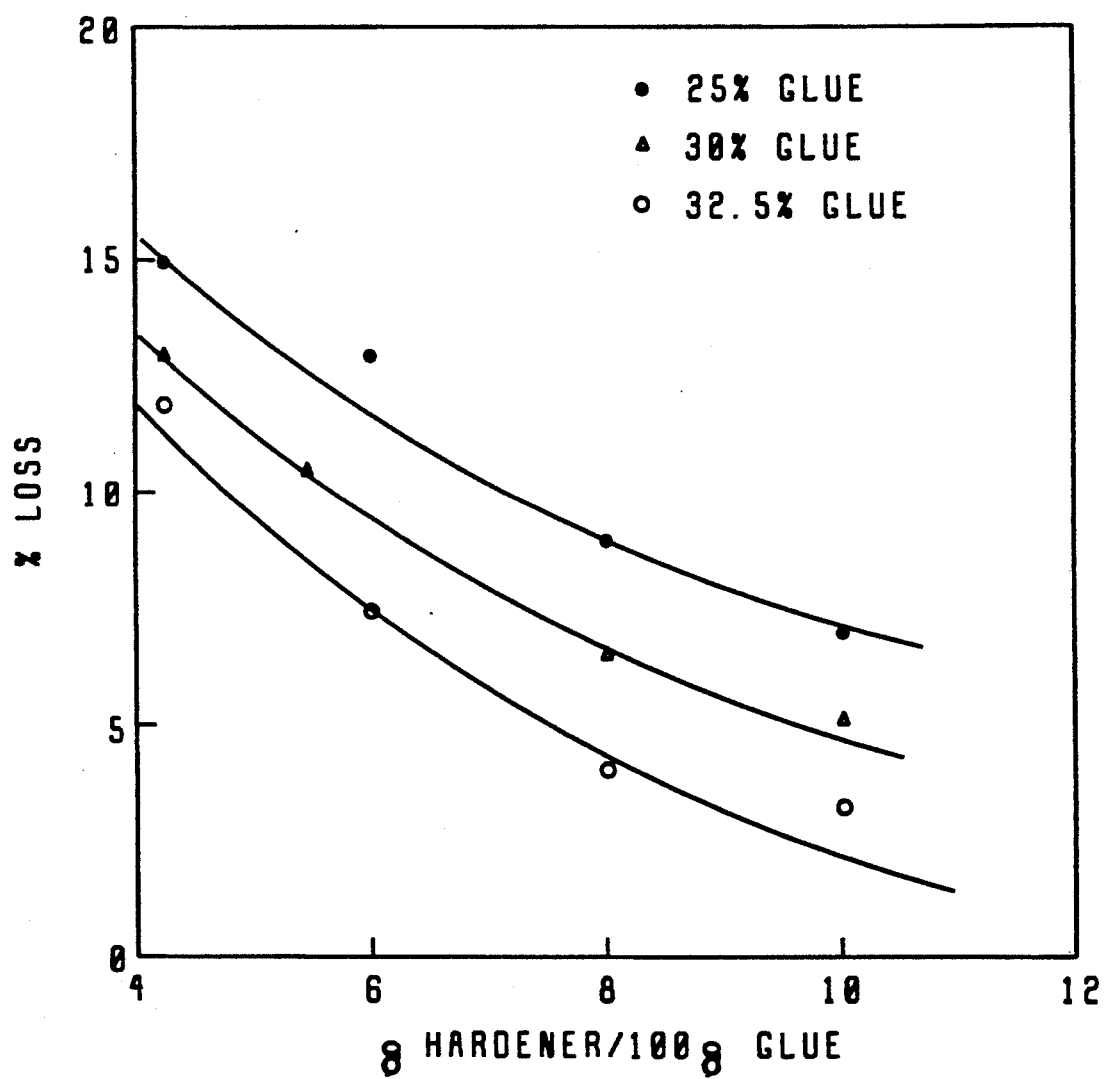
FIG. 6 shows the percentage loss of hardened glue after a ½ hour period of swelling in water at 55° C. as dependent upon the concentration of the hardened glue in the system and the grams of hardener per 100 grams of glue.

In addition to the swelling capacity of the dried glues, the solubility of the glue in water is an indication of the degree of cross-linking which is achieved. FIG. 6 shows the solubility is drastically reduced from complete solubility for non-cross-linked glue to 2–3% for systems with higher levels of hardener.

This lower solubility is associated with a very limited swelling capacity. The features improve the qualities of cross-linked glues, and thus improves the range of practical applications.

Figure 7:
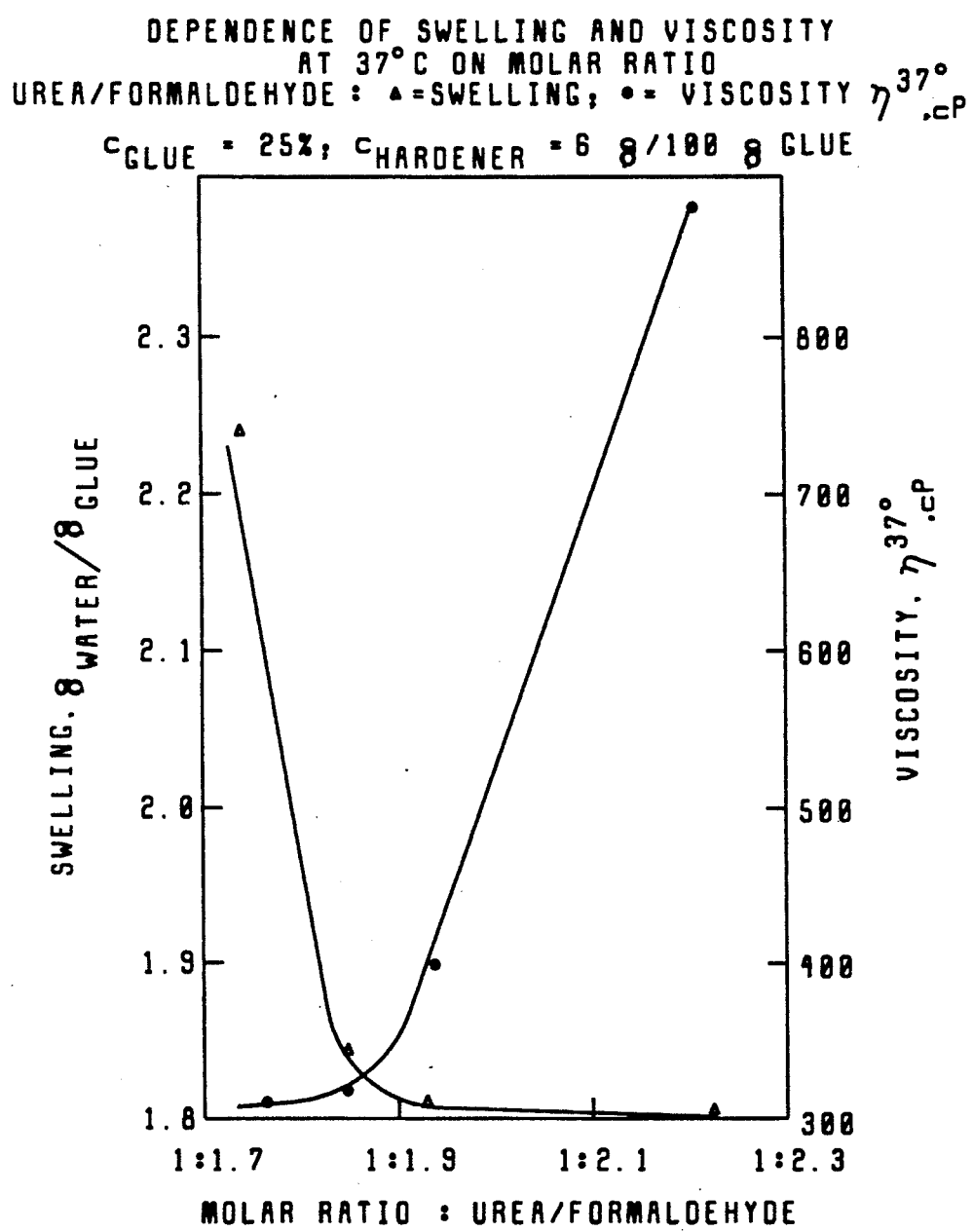
FIG. 7 shows the dependence of the swelling capacity and the viscosity at 37° C. of the hardened glue solution on the change in the molar ratio of urea to formaldehyde reached during the DMU hardener preparation for solutions of 25% glue, wherein the glue system is comprised of 6 grams of DMU hardener per 100 grams of glue.

The molar ratio of urea to formaldehyde comprising the DMU has an effect on the swelling capacity and the viscosity. The ratio will determine the fraction of free formaldehyde in the DMU. Tables 1, 2, 4 and 5 illustrate that when this ratio is less than 1:2, an increase in swelling capacity results because of lower cross-linking accompanied by the lower viscosity of the system. However, FIG. 7 shows that from ratios greater than 1:2 of urea to formaldehyde, no noticeable decrease in swelling capacity is achieved. However, with these greater ratios there is a dramatic increase in viscosity and it is detrimental to the pot-life of the hardened glue. This data shows an optimal solution of DMU hardener is slight under equivalence, specifically the molar ratio of 1.85:1.92, urea:formaldehyde. This behavior can be found for all studied systems, including those stabilized with dextrin, UF-Resins or Latexes.

The latex stabilized DMU when added to animal glue is a composition which, when applied to flexible sheets of paper or cloth for adhering abrasive particles, presents an overall improved sandpaper or sandcloth product than what is presently known in the art.

Accordingly, the preferred embodiments of the invention have been illustrated and described in detail. It is to be understood that numerous changes and variations can be made in the composition and manufacture of the invention without departing from the spirit of the invention, the scope of which is defined by the dependent claims.

What is claimed is:

1. An animal or collagen based glue hardening composition consisting essentially of a product of the reaction between urea and formaldehyde and a stabilizer comprising a latex polymer or a polyhydroxylic compound, wherein the molar ratio of urea to formaldehyde is between approximately 1:1.7 to 1:2.4 moles of urea to formaldehyde.

2. An animal or collagen based glue-hardening composition according to claim 1 wherein said composition is the product of a process comprising the steps of reacting urea with formaldehyde in a medium with pH between approximately 8 and 11, and maintaining the temperature during the reacting step between approximately 20°–30° C.

3. An animal or collagen based glue-hardening composition according to claim 1 wherein said composition is the product of a process comprising the steps of reacting urea with formaldehyde in a medium with a pH of approximately 5, and maintaining the temperature during the reacting step between approximately 80°–100° C.

4. An animal or collagen based glue-hardening composition comprising a hydroxymethyl compound of urea and a stabilizer comprising a latex polymer or polyhydroxylic compound, wherein the hydroxymethyl compound comprises dimethylol urea.

5. An animal or collagen based glue-hardening composition comprising a hydroxymethyl compound of urea and a polysaccharide selected from the group consisting of dextrin and cornstarch.

6. An animal or collagen based glue-hardening composition comprising a hydroxymethyl compound of urea and a stabilizer comprising a latex polymer or a polyhydroxylic compound, wherein the hydroxymethyl compound of urea is comprised of a mixture of the addition product of the reaction of urea formaldehyde and a urea-formaldehyde condensation resin.

7. A polymer glue gel composition comprising a collagen based animal glue and the hardening composition according to claims 1, 2, 3, or 4.

8. A polymer glue gel composition comprising a collagen based animal glue and the hardening composition according to claims 5 or 6.

9. An abrasive material comprising abrasive particles, a flexible sheet of paper or cloth and an adhesive glue gel according to claim 7 wherein said glue gel binds the abrasive particles to the flexible sheet.

10. A method of preparing an animal glue composition comprising:
1) reacting urea with formaldehyde in a ratio of approximately 1:1.7 to 1:2.4 moles of urea to formaldehyde to form a solution containing dimethylol urea;
2) adding a latex or polyhydroxylic stabilizer to said dimethylol urea to form a stabilized DMU hardener; and
3) adding the stabilized DMU hardener to an animal or collagen based glue.

11. A method of preparing an animal glue composition according to claim 10 wherein the concentration of the solution containing dimethylol urea is between approximately 43% and 50%.

12. A method of preparing an animal glue composition according to claim 10 wherein the latex stabilizer is added to the dimethylol urea between 2 and 5 days after the dimethylol urea is formed.

13. A method of preparing an animal glue composition according to claim 10 wherein the ratio of the latex stabilizer to the dimethylol urea is approximately 2.5–12% by weight of latex stabilizer to dimethylol urea.

14. A method of preparing an animal glue composition according to claim 10 wherein the concentration of the stabilized DMU hardener and the animal glue is in a ratio of approximately 4–20 grams of hardener to 100 grams of glue.

15. A method of preparing an animal glue composition according to claim 10 wherein the pH of the mixture containing the stabilized DMU hardener and the glue is between approximately 4.5 and 5.5.

16. A method of hardening animal or collagen based glue which comprises adding a composition consisting essentially of a product of the reaction between urea and formaldehyde and a stabilizer comprising a latex polymer, a polyhydroxylic compound or ammonia to an animal or collagen based glue.

17. A method of preparing an animal glue composition comprising the steps of:
1) reacting urea with formaldehyde in a ratio of approximately 1:1.7 to 1:2.4 moles of urea to formaldehyde to form a solution containing dimethylol urea;
2) adding ammonia to said dimethylol urea to form a stabilized DMU hardener; and
3) adding the stabilized DMU hardener to an animal or collagen based glue.

* * * * *